United States Patent [19]

Katayama et al.

[11] 4,272,120
[45] Jun. 9, 1981

[54] FLANGED VEHICLE ROOF PANEL WITH AN INWARDLY INDENTED SIDE PART

[75] Inventors: Yoshinori Katayama, Tokyo; Hiromasa Torii, Koganei, both of Japan

[73] Assignee: Nissan Motor Company, Limited, Yokohama, Japan

[21] Appl. No.: 72,926

[22] Filed: Sep. 6, 1979

[30] Foreign Application Priority Data

Sep. 16, 1978 [JP] Japan .............. 53-127152[U]

[51] Int. Cl.³ ............................... B60J 7/10
[52] U.S. Cl. ............................ 296/210; 296/195
[58] Field of Search ............... 296/210, 185, 195

[56] References Cited

U.S. PATENT DOCUMENTS

| | | | |
|---|---|---|---|
| 2,576,354 | 11/1951 | Oswald | 296/137 R |
| 3,635,519 | 1/1972 | Foster | 296/137 R |
| 3,666,316 | 5/1972 | Wilfert | 296/137 R |

Primary Examiner—Robert R. Song
Attorney, Agent, or Firm—Schwartz, Jeffery, Schwaab, Mack, Blumenthal & Koch

[57] ABSTRACT

A roof panel for vehicles is disclosed, which comprises a central portion, a side portion at an angle to the central portion, and a narrow flange all down the side portion at an angle to it for welding to a gutter of the vehicle, wherein a rear part of the side portion is indented inwards, towards the central line of the vehicle. This roof panel may be used either for the type of vehicle wherein the gutter extends all the way to the rear end of the side edge of the roof, in which case the roof panel is used as it is; or for the type of vehicle wherein the gutter extends only back to a point somewhat forward of the rear end of the side edge of the roof, in which case the part of the flange behind that point is cut away, and the indented part of the side portion is welded directly to the rear pillar of the vehicle. Thus roof panels for different versions of the same model of automobile may be formed on one die, with consequent improvements in working efficiency.

4 Claims, 11 Drawing Figures

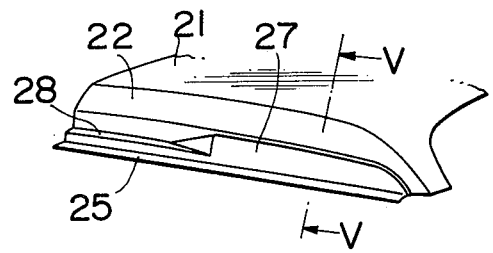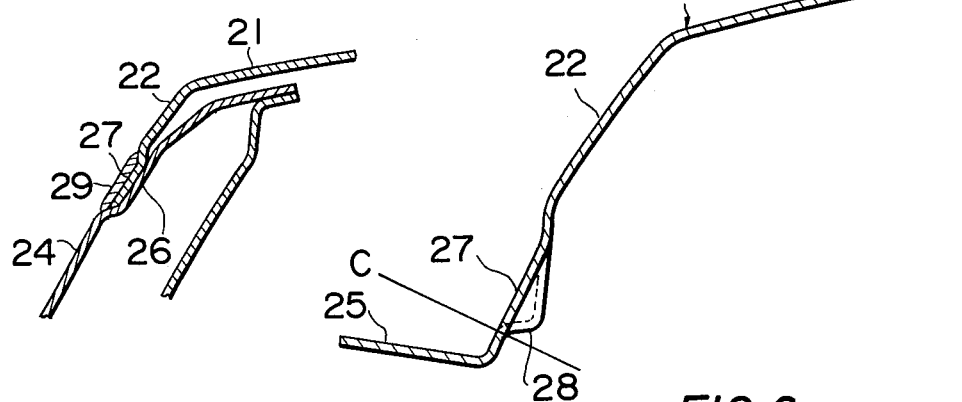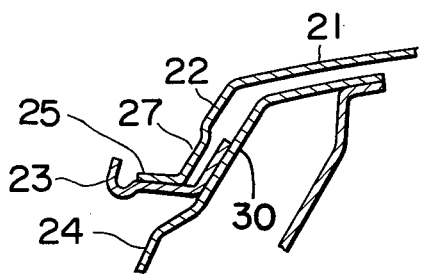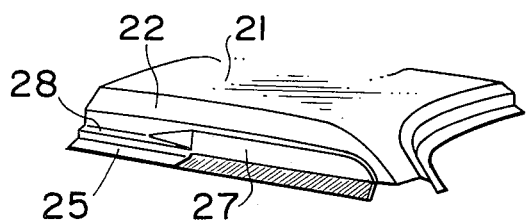

FLANGED VEHICLE ROOF PANEL WITH AN INWARDLY INDENTED SIDE PART

BACKGROUND OF THE INVENTION

The present invention relates to the structure of a vehicle body, and more particularly relates to the structure of the roof panel of a vehicle.

Often, even between different versions of the same model of automobile, the exact configuration of the roof panel of the vehicle, and particularly of the gutter of the vehicle, differs markedly. FIGS. 1A and 1B show an example of this. In FIG. 1A, the rear end of the gutter is some distance in front of the rear end of the side edge of the roof. In FIG. 1B, on the other hand, the rear end of the gutter is substantially at the rear end of the side edge of the roof. Therefore, different structures must be employed for the roof panel, in line with these different gutter structures.

For example, FIGS. 2B and 3B show the construction of a roof panel of the sort which is mated with a gutter which extends all the way to the rear end of the side edge of the roof. Herein a flange 15 is formed along the entire length of the side portion 12 formed on the side of the roof panel 11. As can be seen in section in FIG. 3B, this flange 15 is welded to the upper surface of the gutter 13, which itself has been welded to the side of the vehicle, and particularly to the side pillar of the vehicle 14. Consequently, the roof and the rear pillar of the vehicle are only indirectly joined.

On the other hand, FIGS. 2A and 3A show the construction of a roof panel of the sort which is mated with a gutter which extends backwards ony to a point somewhat forward of the rear end of the side edge of the roof. In this case the flange 5, which corresponds to the flange 15 of FIGS. 2B and 3B, extends only back to the rear end of the gutter. Behind this point, the side portion 2 of the roof is formed with an indented area 7 which is displaced towards the center line of the vehicle, inwards from the general side line of the roof. As may be seen in FIG. 3A, this indented area 7 is directly welded to the rear pillar 4 of the vehicle, at a joining portion 6, and then the recess remaining is filled in with a filling 9 to produce a good visual effect. The indentation of this area 7 is essential, in order to allow for this filling up process. As shown in FIGS. 2A and 2B, a step portion 8, 18 is formed by a plurality of longitudinal folds, to improve strength of the roof, and as a mark for determining position during pressing.

Consequently, if different versions of the same model of automobile are being produced, which have different length gutters, different dies for shaping the roof panel must be used. This means high cost, and high use of factory space.

SUMMARY OF THE INVENTION

Therefore, it is an object of the present invention to provide a multi-purpose roof panel, which can be used for different versions of the same model of automobile which have different length gutters, after only a small cutting operation.

It is another object of the present invention to make two kinds of roof panel with the same die, for two different versions of an automobile.

It is a further object of the present invention to provide a method of making two different kinds of roof panel using the same die, whereby the production processes of the two different kinds of roof panel may take place together for as far along the production process as possible.

According to the present invention, these and other objects are accomplished by providing a roof panel for a vehicle, formed with a folded over side portion which has a flange along the entire length of its edge and which has its rear portion indented, and by providing a method of forming two different types of roof panel for vehicles, both of the type which have a central portion and a side portion extending along a side edge of the central portion, and one being of the type which has a narrow flange portion extending along the entire length of the side edge of the side portion, while the other is of the type which has a narrow flange portion extending from the front end of the side edge of the side portion to a point a certain distance ahead of the rear end of said side edge, and an indented portion displaced towards the center line of said central portion to the rear of said point, comprising the steps of: first forming a pressing which comprises a main central portion, a narrow side portion extending along a side edge of the central portion at a substantial angle thereto, and a narrow flange portion extending along the entire length of the side edge of the side portion which is mated with the gutter at a substantial angle thereto, wherein a rear part of the side portion is indented towards the center line of the central portion; thus to form a roof panel of substantially the first-mentioned type, and subsequently and optionally cutting away the rear part of said flange portion corresponding to said indented portion to form a roof panel of substantially the second-mentioned type.

BRIEF DESCRIPTION OF THE DRAWINGS

The present invention will become more clearly understood from the following description of a preferred embodiment thereof, taken in conjunction with the accompanying drawings. It should be clearly understood, however, that the description of the embodiment, and the drawings, are given for the purposes of illustration only, and are not to be taken as being in any way limitative of the present invention, or of the scope of protection sought to be granted by Letters Patent, which are to be defined solely by the appended claims. In the drawings:

FIG. 4 is a perspective view of a roof panel which is an embodiment of the present invention;

FIG. 5 is a sectional view taken along the line V—V in FIG. 4;

FIG. 6 is a sectional view illustrating the joining of the roof panel of FIG. 4 with the gutter;

FIG. 7 is a perspective view, showing how part of the panel of FIG. 4 can be cut away to form a roof panel suitable for use with a shorthand gutter; and FIG. 8 is a sectional view, showing how the roof panel of FIG. 7 can be joined, at its rear portion, directly to a rear pillar of a vehicle.

DESCRIPTION OF THE PREFERRED EMBODIMENT

Figure 1A:
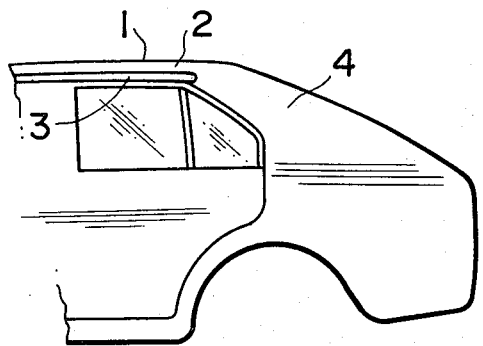
FIGS. 1A and 1B are schematic side views of conventional automobile bodies.
Figure 1B:
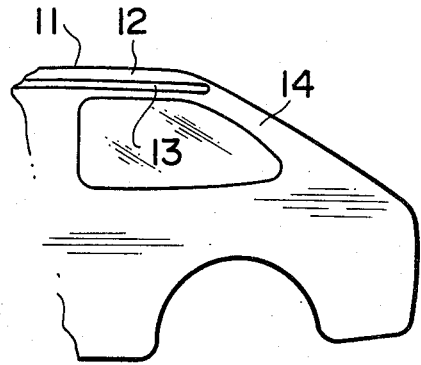
Figure 2A:
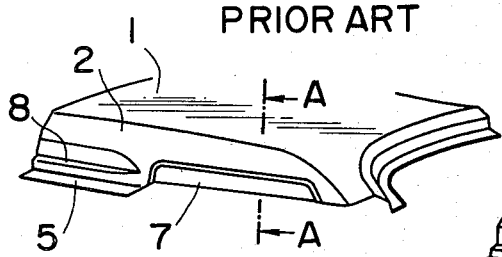
FIGS. 2A and 2B are perspective views of roof panels used in the automobile bodies of FIGS. 1A and 1B.
Figure 2B:
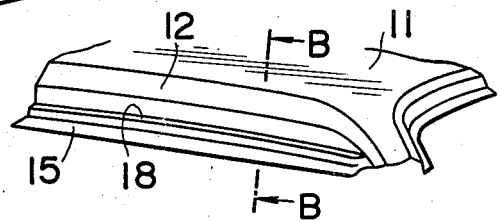
Figure 3A:
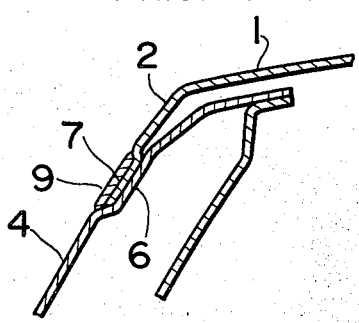
FIGS. 3A and 3B are sectional views of the panels of FIGS. 2A and 2B, taken along the lines A—A and B—B respectively.
Figure 3B:
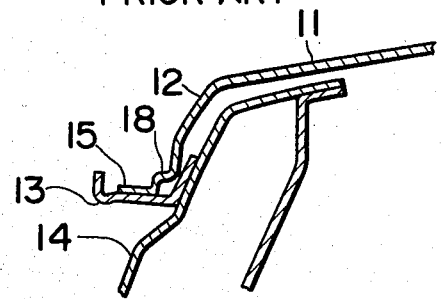

Referring to FIGS. 4 and 5, there is shown a roof panel according to the present invention, which has a central portion 21, a narrow side portion 22, which extends along a side edge of the central portion at a substantial angle to it, the rear portion 27 of this side portion 22 being indented towards the center line of the vehicle away from the main portion of this side portion 22, and a narrow flange portion 25 extending along the entire length of the side edge of the side portion which is not contiguous to the central portion, at a substantial angle thereto.

In the part of the side portion forward of this indented portion 27, step portion 28 is formed by a plurality of longitudinal folds, to improve strength of the roof, and as a mark for determining position during pressing.

This kind of roof panel can be used for both of the two kinds of structure described above. That is, when the panel is to be applied to the version of vehicle wherein the gutter extends all the way back to the rear end of the side edge of the roof, it can be used as it is. In this case, as illustrated in FIG. 6, the flange 25 is welded to the gutter 23, to which the rear pillar 24 has been welded. Thus, in the conventional manner, the rear pillar 24 is indirectly jointed to the roof panel.

On the other hand, if the panel is to be applied to a version of vehicle in which the gutter extends back only to a point somewhat forward of the rear end of the side edge of the roof, then the part of the flange 25 marked by hatching in FIG. 7 is cut away along the line C in FIG. 5. The roof panel resulting from this can be used in the conventional way, as illustrated in FIG. 8. That is, the portion 27 is laid on the joining portion 26 of the rear pillar 24, and the two are welded together. Then the recess remaining is filled with the filling 29. Although the models of the vehicle are the same, in the version which has the gutter extending farther back (FIG. 6), the joining portion 30 on the rear pillar 30 is indented farther than the corresponding joining portion 26 shown in FIG. 8. Therefore, in FIG. 6 the flange 25 is welded to the gutter 23, leaving a space between the joining area 30 and the indented portion 27. In FIG. 8, where there is no gutter, the indented portion 27 may be abutted against and welded directly to joining portion 26.

As can be seen from the preceding description, the roof panel according to the present invention can be used for automobiles of different versions of the same model, with only the small modification of cutting away a part of the flange. Accordingly, only one die is needed to form the flange. Accordingly, only one die is needed to form the roof panels of the different versions. This makes possible a dramatic reduction in the production cost of the vehicle bodies.

What is claimed is:

1. A roof panel for a vehicle which has a rear pillar and a gutter, formed with a main central portion, a narrow side portion extending along a side edge of the central portion at a substantial angle thereto, and a narrow flange portion extending along the entire length of the side edge of the side portion which is mated with a gutter at a substantial angle thereto, wherein a rear part of the side portion is indented towards the center line of the central portion of the panel.

2. A roof panel for a vehicle which has a rear pillar and a gutter, formed with a main central portion, a narrow side portion extending along a side edge of the central portion at a substantial angle thereto, a rear part of which is indented towards the center line of the central portion of the panel for attachment to the rear pillar and a narrow flange portion extending along the entire length of the side edge of the side portion which is mated with a gutter at a substantial angle thereto, so that after possible removal of a rear part of the flange portion the remaining part thereof may be attached to the gutter.

3. A roof panel as claimed in claim 1 or 2, wherein the part of the side portion which is forward of the indented rear portion is formed with a plurality of longitudinal folds which define a step portion therein.

4. A method of forming two different types of roof panels for vehicles, both of the type which have a central portion and a side portion extending along a side edge of the central portion, and one being of the type which has a narrow flange portion extending along the entire length of the side edge of the side portion, while the other is of the type which has a narrow flange portion extending from the front end of the side edge of the side portion to a point a certain distance ahead of the rear end of said side edge, and an indented portion displaced towards the center line of said central portion to the rear of said point, comprising the steps of:

first forming a pressing which comprises a main central portion, a narrow side portion extending along a side edge of the central portion at a substantial angle thereto, and a narrow flange portion extending along the entire length of the side edge of the side portion which is mated with a gutter at a substantial angle thereto, wherein a rear part of the side portion is indented towards the center line of the central portion; thus to form a roof panel of substantially the first-mentioned type;

and subsequently and optionally cutting away the rear part of said flange portion corresponding to said indented portion to form a roof panel of substantially the secondmentioned type.

* * * * *